Jan. 2, 1923.

J. A. CHOW.
STOP PLATE FOR SLICERS.
FILED JUNE 24, 1922.

1,440,374

INVENTOR
J. A. Chow
BY
ATTORNEYS

Patented Jan. 2, 1923.

1,440,374

UNITED STATES PATENT OFFICE.

JUE AH CHOW, OF FORT SHERIDAN, ILLINOIS.

STOP PLATE FOR SLICERS.

Application filed June 24, 1922. Serial No. 570,693.

*To all whom it may concern:*

Be it known that I, JUE AH CHOW, a citizen of the United States, and a resident of Fort Sheridan, in the county of Lake and State of Illinois, have invented a new and useful Improvement in Stop Plates for Slicers, of which the following is a full, clear, and exact description.

My invention relates to improvements in vertical stop plates for cutting boards, and it consists in the combinations, constructions and arrangements herein described and claimed:

An object of my invention is to provide a vertical stop plate for cutting board, which is adapted to have a vegetable held thereagainst so that a piece, ordinarily too small to cut, may be held in position by merely placing the fingers on the piece so as to hold it against the stop plate, and with a knife in the free hand cut the piece into as many thin slices as is desired.

A further object of my invention is to provide a device of the character described, which is extremely simple in construction and which is adapted to be readily secured to any cutting board with but slight alterations being necessary in the latter.

A further object of my invention is to provide a device of the character described which may be readily removed from the cutting board and be disposed in an out of the way place.

Other objects and advantages will appear in the following specification, and the novel features of the invention will be particularly pointed out in the appended claim.

Figure 1:
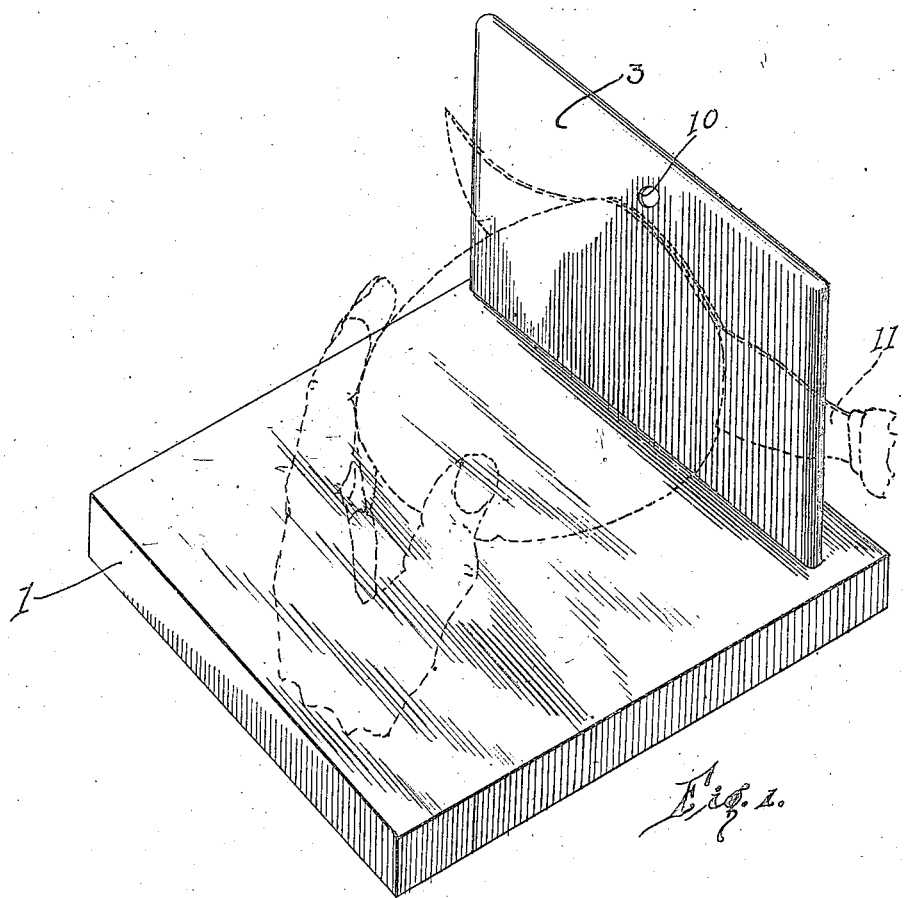
Figure 2:
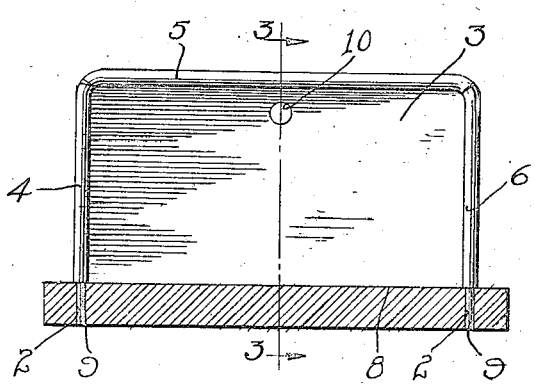
Figure 3:
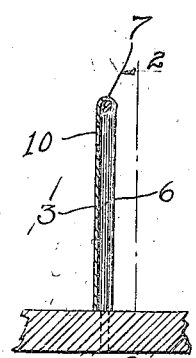

My invention is illustrated in the accompanying drawings, forming part of this application, in which Fig. 1 is a perspective view of the device as shown operatively applied to a cutting board, Fig. 2 is a section along the line 2—2 of Fig. 3, and Fig. 3 is a section along the line 3—3 of Fig. 2.

In carrying out my invention, I make use of an ordinary cutting board 1, which may be of any shape or pattern desired. The board 1 is preferably made of wood so as not to dull the knife, which cuts the vegetable placed thereon. The board 1 is provided with two alined openings 2 adjacent to one edge thereof.

The device comprises a sheet of metal 3 which has three of its sides 4, 5 and 6 bent inwardly so as to enclose the upper part of the U-shaped wire 7. It will be noted from Fig. 2 that the wire 7 projects beyond the bottom 8 of the plate 3. Projections 9 form supporting legs which enter the openings 2. In this manner, the plate 3 is rigidly held in vertical position and at the same time provides a simple supporting means, whereby the plate may be instantly removed from the board 1. The plate is further provided with an opening 10 adjacent to the upper edge thereof, this opening permitting the device to be hung on a nail or the like.

From the foregoing description of the various parts of the device, the operation thereof may be readily understood. As heretofore stated, the board 1 is ordinary in construction and is used for cutting vegetables. The device is employed when a piece of vegetable is too small to safely hold in the hand and at the same time cut the piece into very thin slices. Even though the small piece could be held in safety in the hand while cutting the piece, it would be practically impossible to cut the entire piece into a plurality of very thin slices. To accomplish this purpose, the plate 3 is secured to the board in an adjusted position by disposing the legs 9 in the openings 2. The small piece of vegetable may now be held firmly against the plate 3 by merely placing one or more fingers against the side of the piece which is opposite to the side abutting the plate. In Fig. 1, I have shown how the piece is held against the plate 3 so as to permit the knife 11 to cut the piece into as many thin slices as desired. Since only one or more fingers of the hand has to contact with the vegetable, the vegetable may be cut with perfect safety to the operator. Furthermore, the vegetable may be cut into very thin slices which would be impossible if the device were not used. The device is very simple in construction and is thoroughly efficient and durable for the purpose intended. When the operator is through using the device, he may remove it from the board 1 and dispose it in an out of the way place, whereby the board may be used in the ordinary manner. It is obvious that the device may be manufactured at a very small expense.

I claim:

The combination with a board having two openings therein, of a stop member adapted to be secured in a vertical position to said board, said member comprising a U-shaped wire and a plate disposed on said wire and having three sides thereof bent around said wire so as to secure said plate to said wire, said plate being secured to said wire in such a manner that the plate is flush with one side of said wire, whereby said stop member is provided with one side which has gently curved edges, the free ends of said wire extending beyond said plate and being removably received in said board.

JUE AH CHOW